United States Patent [19]
Linsker et al.

[11] Patent Number: 5,598,473
[45] Date of Patent: Jan. 28, 1997

[54] DIGITAL SIGNATURE GENERATOR/VERIFIER/RECORDER (DS-GVR) FOR ANALOG TRANSMISSIONS

[75] Inventors: Ralph Linsker, Millwood; Charles H. Bennett, Croton-on-Hudson, both of N.Y.

[73] Assignee: IBM Corporation, Armonk, N.Y.

[21] Appl. No.: 292,155

[22] Filed: Aug. 17, 1994

[51] Int. Cl.$^6$ ............................... H04L 9/30; H04N 1/44
[52] U.S. Cl. ................................................ 380/18; 380/30
[58] Field of Search ......................................... 380/18, 30

[56] References Cited

U.S. PATENT DOCUMENTS

| | | | |
|---|---|---|---|
| 4,140,873 | 2/1979 | Kinch, Jr. et al. | 380/48 X |
| 5,018,196 | 5/1991 | Takaragi et al. | 380/30 |
| 5,097,504 | 3/1992 | Camion et al. | 380/23 |
| 5,168,371 | 12/1992 | Takayanagi | 380/18 X |
| 5,337,362 | 8/1994 | Gormish et al. | 380/30 X |

*Primary Examiner*—Gilberto Barrón, Jr.
*Attorney, Agent, or Firm*—Stephen S. Strunck; Whitham, Curtis, Whitham & McGinn

[57] ABSTRACT

A method and apparatus authenticates and provides non-repudiability for analog messages which renders it impossible for a person, including the recipient, who is not in possession of a (cryptographic) key belonging to the claimed sender, to forge the message. The recipient is able to verify that the sender possessed the correct key, and a third party (judge) can establish whether the message was forged or not. This is accomplished by interposing a digital signature generator/verifier/recorder (DS-GVR) module in the sending apparatus, such as a facsimile machine. The receiver, using another DS-GVR, can verify that a received document comes from the purported sender and has not been altered enroute. The receiver's DS-GVR module can be made to produce a machine-readable record of the signed transmission. Retention of such a machine-readable record by the receiver prevents the sender from repudiating legitimate messages, because it enables the receiver to prove to a third party such as a judge that the corresponding message was generated by the sender and not by the receiver.

8 Claims, 4 Drawing Sheets

5,598,473

DIGITAL SIGNATURE GENERATOR/VERIFIER/RECORDER (DS-GVR) FOR ANALOG TRANSMISSIONS

BACKGROUND OF THE INVENTION

1. Field of the Invention

The present invention generally relates to the authentication and non-repudiation of communications between a transmitter and a receiver and, more particularly, to an apparatus for the authentication and non-repudiation of transmitted documents using a digital signature. The invention is particularly useful in the authentication and non-repudiation of documents transmitted between facsimile machines by analog telephone line, but may be advantageously used to authenticate and prevent repudiation by the sender of other analog messages including, but not limited to, telephone conversations, analog video and the like.

2. Description of the Prior Art

Digital signatures have been used for some time on digital documents such as electronic mail to provide the two main functions of an ink signature on a paper document, namely: (1) "authentication" or proving to the receiver that the document was created by the purported sender and has not been modified in transit, and (2) "non-repudiation" or enabling the receiver to prove to a third party, such as a judge, that the document was created by the purported sender. This latter ability prevents the sender from repudiating a genuine document, such as a promise to pay, by falsely claiming that it is a forgery created by the receiver.

Most digital signature schemes use a public/private key system to provide authentication and non-repudiation for transmitted data. See for example W. Diffie and M. Hellman, "New Directions in Cryptography", *IEEE Transactions on Information Theory*, IT-22, pp. 644–645 (November 1976), and R. L. Rivest, A. Shamir and L. Adleman, "A Method for Obtaining Digital Signatures and Public-Key Cryptosystems", *Communications of the ACM*, 2, No. 21, pp. 120–126 (February 1978). Digital signatures obtained with a public-key algorithm can be validated by anyone knowing the public-key of the sender.

Ordinary documents transmitted by facsimile lack the verifiable authenticity of paper documents in two respects. First, they can be forged by third parties claiming to be the purported sender, or be subjected to undetectable modification in transit. Second, a genuine document can later be repudiated by the actual sender, who may falsely claim that the document is a forgery created by the receiver.

SUMMARY OF THE INVENTION

It is therefore an object of the present invention to provide a method and apparatus that authenticates and provides non-repudiation for analog messages using digital signatures.

According to a preferred embodiment of the invention, a method and apparatus are provided which renders it impossible for a person, including the recipient, who is not in possession of a (cryptographic) key belonging to the claimed sender, to forge the document. The recipient is able to verify that the sender possessed the correct key, and a third party (judge) can establish whether the document was forged or not. This is accomplished by interposing a digital signature generator/verifier/recorder (DS-GVR) module in the sending facsimile machine. The receiver, using another DS-GVR module, can verify that a received document comes from the purported sender and has not been altered enroute. Optionally, the receiver's DS-GVR module can be made to produce a machine-readable record of the signed transmission.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
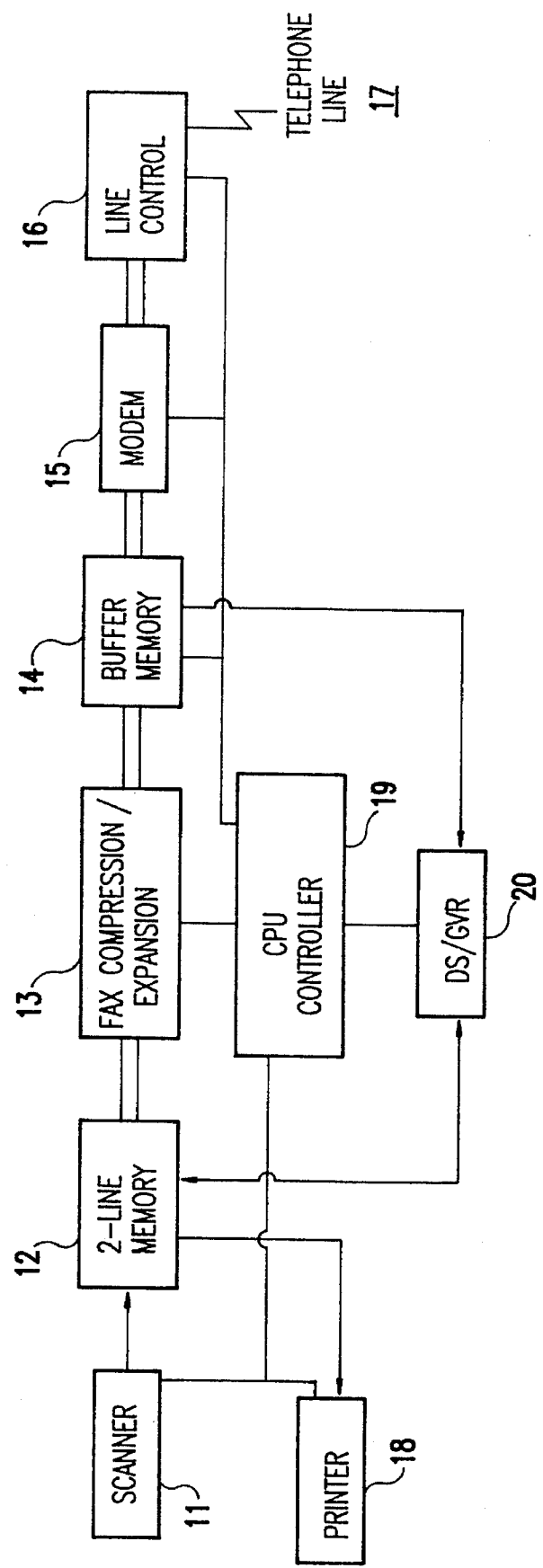
FIG. 1 is a block diagram of a facsimile machine with the addition of the DS-GVR module according to the invention.

Referring now to the drawings, and more particularly to FIG. 1, there is shown a block diagram of a conventional facsimile machine modified to include a digital signature—generator/verifier/recorder (DS-GVR) module according to the invention. The input to the facsimile machine is a scanner 11 which accepts an input image document and generates, line by line, a digital message typically in the form of 1-bit pels (for picture elements). The 2-line memory 12 stores the pels for two adjacent scan lines. The facsimile compression/expansion unit 13 compresses this message into the standard facsimile coded form used for Group 3 facsimile transmission. The buffer memory 14 stores a page of compressed information, and the modem 15 converts coded information from buffer memory 14 into an analog signal that is transmitted via the line control unit 16 over a telephone line 17. The line control unit 16 comprises the standard telephone company jack and dialing equipment and may or may not include a handset for voice communication.

The double lines between the 2-line memory 12, the facsimile compression/expansion unit 13, buffer memory 14, modem 15, and the line control unit 16 indicate connections that function in half-duplex mode; that is, in one direction at a time depending on whether the facsimile machine is sending or receiving. Thus, when receiving a facsimile, the direction of signal flow is reversed. The modem 15 decodes the analog signal into a digital facsimile coded message which is stored in the buffer memory 14. This message is then expanded in the facsimile compression/expansion unit 13 to produce a black/white pel bitstream that is buffered by the 2-line memory 12 to the printer 18 to produce output hardcopy. In both transmitting and receiving modes, the central processing unit (CPU) controller 19 manages the flow of data and state settings of the various blocks described.

Conventional variations of this basic facsimile machine construction include replacing the scanner 11 by a computer that transmits a stored digital image, and replacing the printer 18 with a digital storage unit so that the image may be displayed on a computer screen or printed at a later time. For more information concerning facsimile machines of the type described thus far, reference is made to K. R. McConnell, D. Bodson and R. Schaphorst, *FAX: Digital Facsimile Technology and Applications*, 2nd Ed., Artech House, Norwood, Mass. (1992).

The present invention adds to this basic facsimile machine a digital signature—generator/verifier/recorder (DS-GVR) module 20 with connections to the 2-line memory 12 and the buffer memory 14 and controlled by the CPU 19 as shown in FIG. 1. The invention is intended for use with Group 3 ECM (error correction mode). The ECM procedure comprises (as described, for example, by McConnell et al., supra, at page 57) dividing the coded data stream (each page of buffer memory 14) into multiple frames, generating and transmitting a redundant code with each frame, having the receiver check each frame and, after the page is transmitted, request retransmission of each error-containing frame. Other fallback procedures may be provided if repeated transmission fails.

Figure 2:
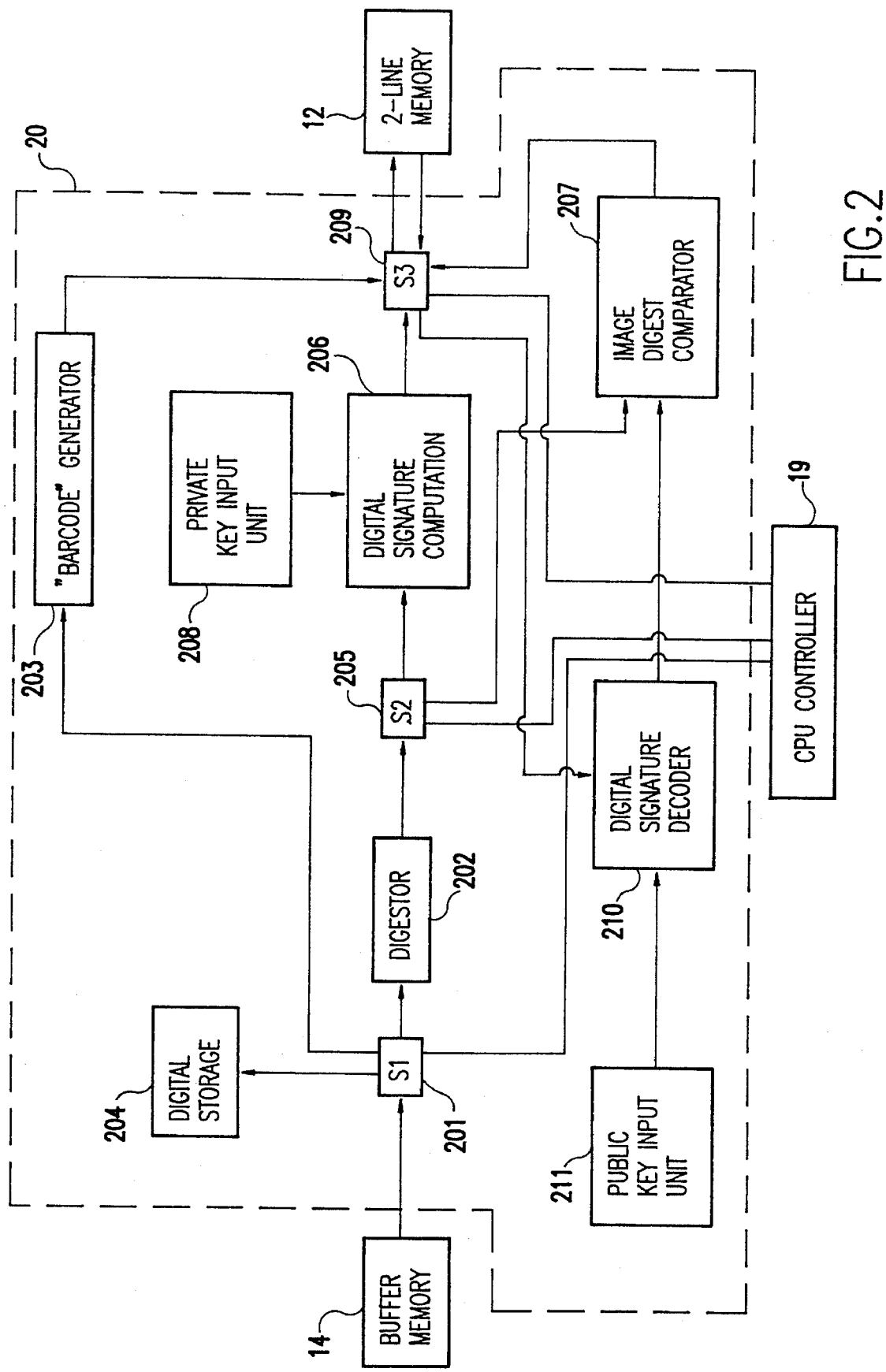
FIG. 2 is a block diagram showing the construction of the DS-GVR module according to the invention.

Turning now to FIG. 2, there is shown in more detail the components of the DS-GVR module 20 and the connections of that module to the 2-line memory 12, buffer memory 14, and the CPU controller 19. For clarity, we need to distinguish two types of document information. The first type is the set of pages of the document that would be transmitted using a conventional facsimile machine (i.e., without the DS-GVR module). We refer to this set of pages (after any required error correction upon reception has been performed so that these pages may be assumed error-free) as the "compressed digital image (CDI)". The CDI is in a facsimile coded form. The second type is the additional information generated and used by the DS-GVR, which is preferably transmitted as a single page following the CDI, and using the same facsimile coded format as the CDI. We refer to this additional information as the "DS-GVR page".

The buffer memory 14 stores one page of digital information in compressed facsimile coded form. This may be either a page of the CDI or the DS-GVR page. The modem 15, buffer memory 14, the facsimile compression/expansion unit 13, and the 2-line memory 12 do not distinguish between these two types of page. Only the DS-GVR module of the invention makes this distinction. During a facsimile reception, the contents of the buffer memory 14 are updated by any required retransmissions of error-containing frames. The buffer memory only releases its contents as output after error correction has been completed.

When an end-of-page condition exists (i.e., buffer memory 14 contains a page during facsimile transmission, or an error-free page during facsimile reception), the page is read out from buffer memory 14 and is routed via switch 201 to one or more of the three units, a digestor 202, a "barcode" generator 203, or a digital storage 204. The barcode generator 203 and the digital storage are not both required; either one will suffice.

All pages, except the DS-GVR page noted above, are routed to the digestor 202 both during transmission and reception. The barcode generator 203 and/or digital storage 204 are used only during facsimile reception, and then only for documents for which the receiver desires a non-repudiable record. During reception of such documents, the switch 201 routes every page of the CDI both to the digestor 202 and also to one or more components 203 and 204.

The digestor 202 is a standard component. See, for example, R. Rivest, "The MD4 message digest algorithm", in A. J. Menezes and S. A. Vanstone, editors, *Advances in Cryptology—CRYPTO '90 Proceedings,* pages 303–311, Springer-Verlag (1991), and R. Rivest, "The MD5 Message-Digest Algorithm", MIT Lab for Computer Science Network Working Group Request for Comments, 1321, April 1992. The MD5 digestion algorithm is the most widely used nowadays.

Consider first the case of a facsimile transmission. Each page of the CDI is routed via switch 201 to the digestor 202. The last page of the material in the buffer memory 14, before the end of the transmission, is not part of the CDI; rather, it is instead the facsimile coded information that will have been generated by the DS-GVR module itself, as described in more detail below. Accordingly the last page from the buffer memory 14 is blocked by switch 201. It does not enter the DS-GVR module; however, it does follow the usual path, which does not involve the DS-GVR, from the buffer memory 14 to the modem 15, as shown in FIG. 1.

Consider next the case of a facsimile reception. Each page received by the buffer memory 14 is routed via switch 201 to the digital storage unit 204 and/or the barcode generator 203 (if a non-repudiable record is desired). In addition, each page received by buffer memory 14 that is a page of the CDI (that is, each page of the document except the last) is routed via switch 201 to the digestor 202. The DS-GVR page, which is the last page received if a DS-GVR apparatus is used to send the facsimile, is not routed to the digestor 202, this path being blocked-by switch 201.. To carry out the above routing or blocking functions, a signal from CPU controller 19 specifies whether the page in buffer memory is the last page of the facsimile transmission or not.

During both facsimile transmission and reception, the following events take place. The digestor 202 accepts the CDI (one page at a time) as input and generates a single short (e.g., 512-bit) digital message called an "image digest (ID)" after the CDI has been completely processed. The image digest is initialized at the start of the facsimile document transaction and modified by the digestor 202 as each new page is processed, and the image digest is in final form after the last page of the facsimile document has been processed. Only the final form of the image digest is provided as the output from the digestor 202.

The image digest is routed via switch 205 to either a digital signature computation unit 206 (i.e., during facsimile transmission) or to an image digest comparator 207 (i.e., during facsimile reception). During facsimile transmission, the digital signature computation unit combines a private key from private key input unit 208 with the image digest to generate a digest signature (DS) comprising typically a few hundred bits. The digital signature computation process and the use of private and public keys has been described by, for example, Diffie and Hellman and by Rivest, Shamir and Adleman, supra. The digest signature is routed via switch 209 to the 2-line memory 12. The switch 209 is closed, allowing the DS to be sent, only after the last page of the CDI has been sent. The DS-GVR page, which follows the CDI, comprises the digest signature DS and, optionally, other information such as the sender's identity and a plain or certified copy of the sender's public key.

To describe the flow of information during a facsimile reception, we start with switch 209. The DS-GVR page, after facsimile expansion by unit 13 shown in FIG. 1, comprises the sender's digest signature DS and, optionally, the purported sender's identity and a plain or certified copy of the purported sender's public key. This information is routed to the digital signature decoder 210.

The digital signature decoder 210 has two functions. First, it obtains a reliable value of the sender's public key, and second, it uses this public key to decode the received digest signature (DS) obtained from switch 209, thereby producing a reconstructed image digest (RID). One option for performing the first function is to have the operator of the receiving facsimile machine enter the sender's public key (obtained, for example, from a published directory of public keys) manually, via the public key input unit 211. Another option is to have the receiving digital signature decoder 210 validate, using known methods, a so-called certified copy of the sender's public key, if the sender has included it in the DS-GVR page. A "certified copy" of a key is a copy accompanied by a digitally signed certificate from some notarizing authority attesting that the purported sender has indeed registered the claimed public key with that notarizing authority. If the receiver trusts the notarizing authority and knows (or has already stored in the receiving facsimile machine) the notarizing authority's public key, the authority's signature can be decoded, thereby validating the correctness of the claimed sender's key. A third option, if the sender has supplied only a plain, uncertified copy of his or her public key, is to use the claimed public key provisionally without checking it. In this case, the receiver cannot be sure of the sender's identity until the claimed public key has been compared with a published directory, or other trusted source of public keys.

Next, the digital signature decoder 210 uses the public key obtained above to decode the digest signature using known methods. The result of this decoding is called the reconstructed image digest (RID). The RID and the image digest ID that is routed from switch 205 are compared by the image digest comparator 207. Note that the ID is computed by the receiving facsimile machine's digestor 202, while the RID is the result of decoding the DS obtained from the sender. The ID and RID will agree if and only if the following two conditions hold: 1) the private key used by the sender is indeed the inverse (in the sense described by Diffie and Hellman, supra) of the public key that is associated (e.g., via public key directories) with the sender, and 2) the received CDI, after any necessary error correction retransmissions, is identical to the CDI produced by the sender.

The result of processing by the image digest comparator 207 is the determination that the sender is authentic (i.e., used the private key that is indeed the inverse of the purported sender's public key) or not. This result is preferably formatted into human-readable form and sent to the two-line memory 12 via the switch 209, so that it will be printed along with the DS-GVR page. Alternatively, this result may be signaled to the recipient by other means (e.g., an audible signal, a message on the receiving facsimile machine's display, or the like).

Two main functions are provided by the invention at the receiver. First, the invention provides authentication, so that the recipient is convinced that the sender is who he claims to be. Second, the invention provides non-repudiation, so that the recipient can prove to a judge at a later date that the purported sender was indeed the actual sender, or at least that the actual sender possessed the purported sender's private key. The apparatus used for the authentication function has been described above. The additional apparatus used for the non-repudiation function will now be described.

To provide non-repudiation, the recipient must retain digital information that is identical to the CDI or that can be used to reconstruct the CDI without error. Then the recipient is able to prove to a third party (e.g., a judge) that this CDI, when processed by the digestor 202, produces an image digest ID that exactly matches the reconstructed image digest RID obtained by applying the purported sender's public key to the received digest signature DS. By the nature of public-key cryptographic systems, it is for all practical purposes impossible for someone to fabricate a DS having this property, that is, ID=RID, without knowing the private key that is the inverse of the public key. Thus, the DS must have been created by someone who knew the correct private key.

To accomplish this proof, the recipient must retain the CDI (as stated above), the DS, and the public key that was in effect when the document was transmitted. Since the CDI is typically a large file, it is preferably stored either in digital form (using the digital storage unit 204) or in a convenient machine-readable hardcopy form. The DS and the public key comprise hundreds of bits and are preferably also encoded in the same digital or machine-readable form. While only the CDI is discussed below, it is to be understood that the DS and public key may be processed in the same way. A preferred such machine-readable hardcopy form is "barcode" type marks printed on paper. Two-dimensional barcodes have been discussed (see, for example, McConnell et al., supra, at pages 276 and 277) as a way of storing digital information reliably and compactly on paper. The barcode generator 203 accepts the CDI, one page at a time, and encodes the CDI page (which is already in Group 3 facsimile coded form) as a black-and-white pel bitstream. This bitstream is routed via the 2-line memory 12 to the printer 18, where it is printed as a two-dimensional barcode. Obviously, other desired compact machine-readable forms may also be used. The barcodes are preferably printed in otherwise unused portions of the facsimile page, such as the margins. Alternatively, the barcodes may be printed on a set of separate pages containing only barcode material that are interspersed with the text containing facsimile pages or following the text containing pages. In the last mentioned case, a buffer memory (not shown) must be provided that can store all of the barcode information for the entire document.

Figure 3:
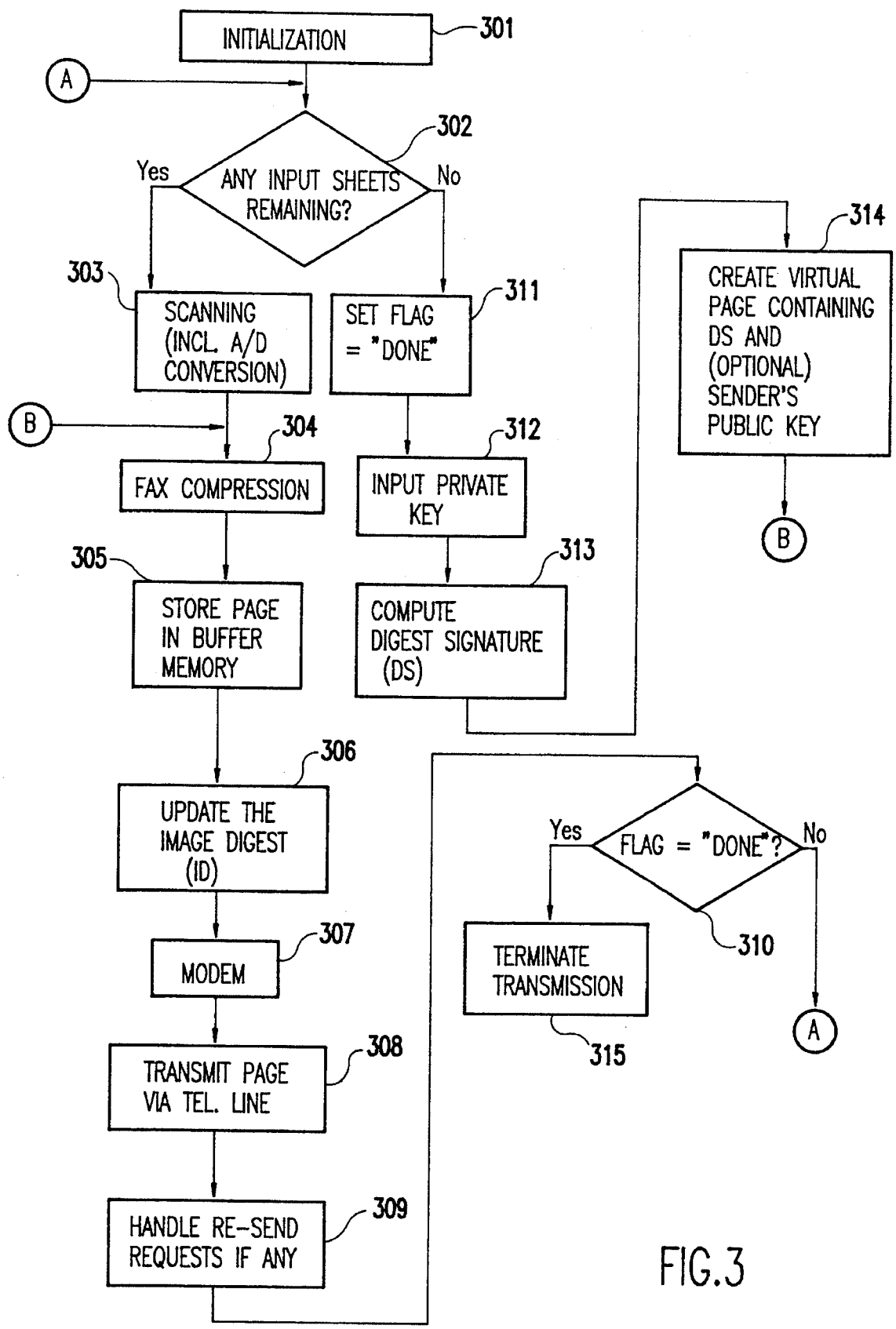
FIG. 3 is a flow diagram illustrating the process performed at the transmitting facsimile machine.
Figure 4:
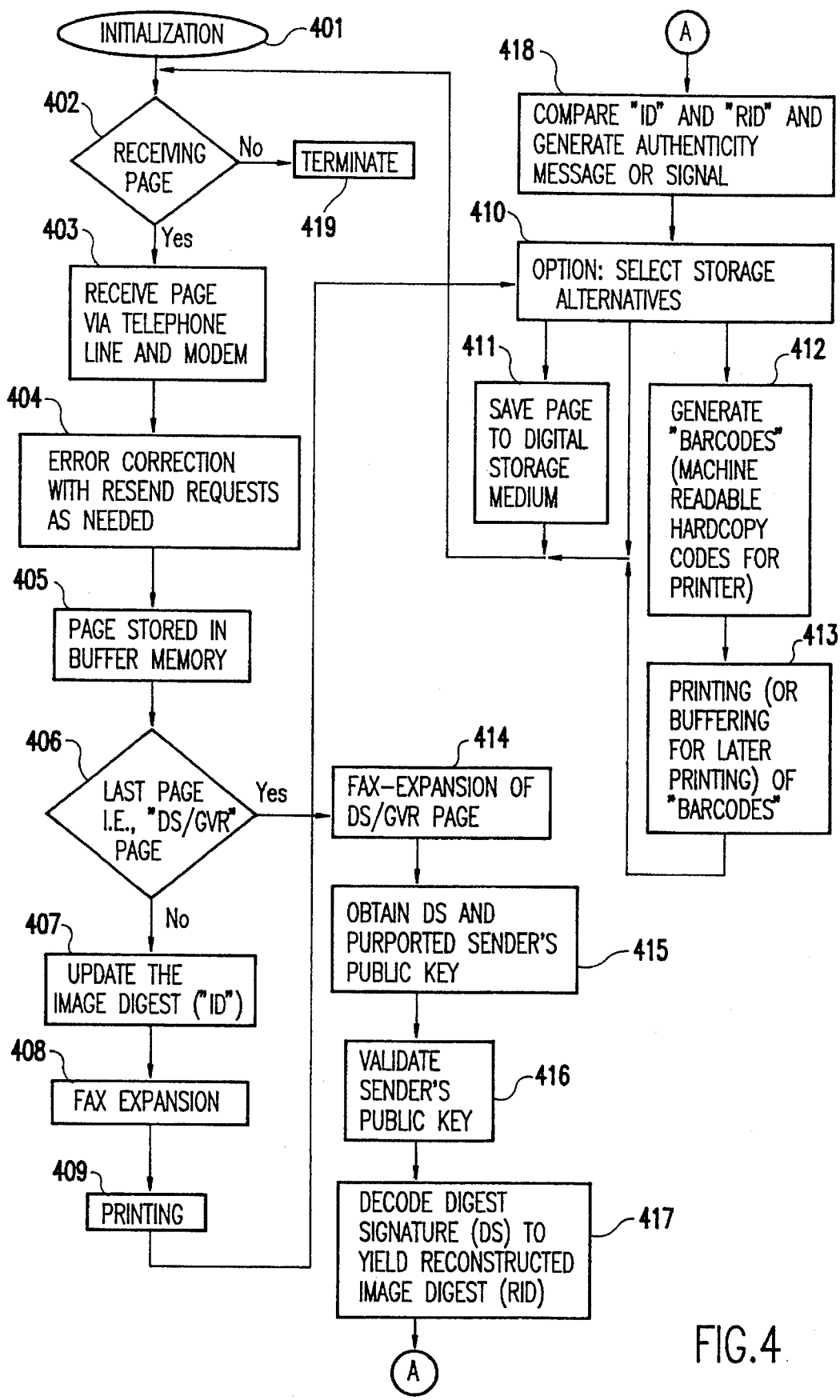
FIG. 4 is a flow diagram illustrating the process performed at the receiving facsimile machine.

FIGS. 3 and 4 show the logic of the process according to the invention. Referring first to FIG. 3, the initialization step in block 301 occurs at the beginning of transmission of the document and includes initialization of the image digest (ID). This step also includes the conventional initialization functions of a conventional transmitting facsimile machine, as described in McConnell et al., supra. A test is next made in decision block 302 to determine if there are additional sheets in the scanner. If so, the next sheet is scanned, and the facsimile machine then creates an analog output signal as the document is being scanned in function block 303. The analog signal from the scanner is subjected to an analog-to-digital (A/D) conversion to generate a digital signal. This digital signal is processed by the facsimile compression/expansion unit 13 to generate a page of the compressed digital image (CDI) in function block 304 which is stored in buffer memory 14 in function block 305. The image digest (ID) is updated in function block 306 as each page of the CDI is processed. The ID is retained in the digestor 202 until all input sheets have been processed. The CDI page is sent to the modem 15 in function block 307. The modem transmits the page via the telephone line 17 in function block 308 and also handles any resend requirements in function block 309.

The operation described thus far is conventional, but for the initialization of the image digest (ID) in function block 301 and the updating of the ID in function block 306. In addition to these two modifications, the invention adds the following process. First, a test is made at decision block 310 to determine if a flag (FLAG=DONE) is set. If not, the process loops back to decision block 302 to determine if there are any further sheets remaining in the scanner. Assuming that all sheets have been scanned. the flag is set in function block 311. At this point in the process the sender's private key is input in function block 312, and the digest signature is computed in function block 313 using the sender's private key. A virtual page containing the DS and, optionally, the sender's public key is created in function block 314. The process then loops back to function block 304 where the facsimile compression is performed on this data which is ultimately transmitted via the telephone line. Now when the test is made in decision block 310, the flag is found to be set, and the transmission terminates in function block 315.

As mentioned earlier, the sender's private key can be input from secure storage, as represented by the private key input unit 208 shown in FIG. 2, or the sender may be prompted to provide a private key. The private key may be generated by the CPU controller 19 using digital information from a card inserted into a card reader by the sender and a personal identification number (PIN) entered by the sender on keyboard. To protect the sender's private key from unauthorized use, this key is preferably entered using a PIN-activated "smart card." That is, the smart card stores the private key but does not release it unless and until the sender enters the correct PIN which is transmitted to the smart card via the card reader. In any case, when the private key is input, the digest signature (DS) is computed.

At the receiver, the facsimile machine is initialized in function block 401 upon receiving a call, as described by McConnell et al., supra. In addition, as in the case of transmission, the initialization step includes initialization of the image digest (ID) value. Next, a test is made in decision block 402 to determine if an incoming page is being received. If so, the analog signal for the incoming page is received in function block 403 via the telephone line 17 and modem 15. Error correction is performed, as necessary, in function block 404, including handling of any re-send requests. As pages are received, they are subjected to A/D conversion and stored in buffer memory 14 in function block 405. As each page is stored in buffer memory 14, a test is made in decision block 406 to determine if the last page has been received. The last page in the practice of the present invention is the DS-GVR page. If the page being processed is not the last page, the image digest (ID) in buffer memory is updated in function block 407, and the ID is then subjected to facsimile expansion in facsimile compression/expansion unit 13, as indicated in function block 408. The expanded image data is buffered by 2-line memory 12 and printed by printer 18 in function block 409.

The process then goes to option block 410 where a preset condition code in the receiving facsimile machine specifies which storage alternative(s) to use. This condition code can be changed by the operator at will, just as other conditions, such as how many times to ting, are conventionally entered into a facsimile machine. The preset code could, for example, direct storage of the page to digital storage 204, in function block 411, or to generate barcodes (or other machine-readable codes), in function block 412, or both. In the latter case, the barcodes are printed or buffered for later printing in function block 413. It may also be an option not to store the message. Whatever the action selected by the preset code, the process loops back to decision block 402 to receive the next page.

This is the preferred embodiment, but alternatively, the operator can be prompted to select storage alternatives at function block 410. If this option is implemented, the operator can select either or both of these storage paths, i.e., to store the page to digital storage 204 and/or to generate barcodes, or neither.

If the page being processed is the last page, as determined in decision block 406, then the facsimile compression/expression unit 13 is used to expand the DS-GVR page, as indicated in function block 414. The DS and the public key of the purported sender are obtained in function block 415. As mentioned, the sender's public key optionally may be transmitted with the document. Alternatively, the receiver may obtain the sender's public key from a registry of public keys. The sender's public key is validated in function block 416, and using the public key, the digest signature (DS) is decoded in function block 417 to yield a reconstructed image digest (RID). The RID and the ID are compared in function block 418 to generate an authenticating message or signal. Again, the storage options are detected in option block 410, and once the storage option has been executed, the process loops back to decision block 402 where, this time, the process terminates in function block 419.

DESCRIPTION OF AN ALTERNATIVE EMBODIMENT

The preferred embodiment described above is an internal modification of a standard facsimile machine, comprising a DS-GVR module incorporated within the machine as shown in FIGS. 1 and 2. An alternative embodiment is a stand-alone DS-GVR module interposed in the analog telephone lines of standard, unmodified facsimile machines. One such module would be interposed in the sending facsimile machine's outgoing telephone line, and another identical module would be interposed in the receiving facsimile machine's incoming analog line. The stand-alone DS-GVR module would differ from the internal DS-GVR module of FIG. 2 chiefly in having an upstream port and a downstream port, each equipped with a modem and line control. In use, the upstream port of the sender's stand-alone DS-GVR would be connected to the telephone line from the sending facsimile machine, the downstream port of the sender's stand-alone DS-GVR would be connected to the outgoing telephone line, the receiver's stand-alone DS-GVR upstream port would be connected to the incoming telephone line, and the receiver's stand-alone DS-GVR downstream port would be connected to the receiving facsimile machine.

The additional modem and line control components would enable the upstream port of the sender's stand-alone DS-GVR module to engage in a Group 3 ECM protocol with the sender's facsimile machine, concurrently with the downstream port of the sender's stand-alone DS-GVR module engaging in a Group 3 ECM protocol with the upstream port of the receiver's stand-alone DS-GVR module, and the downstream port of the receiver's stand-alone DS-GVR engaging in a Group 3 ECM protocol with the receiver's facsimile machine. When all these protocols had terminated successfully, any error-containing pages along any of the analog links would have been corrected, and the authentication and non-repudiation functions, as described above for the sender and receiver, would have been performed instead by the sender's and receiver's stand-alone DS-GVR modules, respectively.

As mentioned, the invention has more general application than just the authentication and non-repudiation of facsimile transmission of documents. While the process has been described in terms of a telephone facsimile machine, the analog signal might be, for example, a telephone message, an analog video signal, or the like.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of using digital signatures to authenticate analog messages transmitted between a sender and a receiver using a public key algorithm, the sender having a private key and a registered public key, the method comprising the steps of:

generating an analog signal corresponding to an analog message to be authenticated;

converting the analog signal to a digital message signal;

computing a first image digest from said digital message signal;

computing a digest signature using the sender's private key and the computed first image digest;

combining at least the digital message signal, the computed digest signature and the sender's public key to form said composite digital message;

converting the composite digital message to a composite message analog signal;

transmitting the composite message analog signal to a receiver;

converting a received composite message analog signal to a received composite digital message signal which is decomposed to yield the recovered digital message signal and the recovered digest signature;

recovering the sender's public key from the received composite digital message;

validating the sender's public key;

decoding the recovered digest signature to yield a reconstructed image digest using a public key provided by the sender to the receiver;

computing a second image digest from the recovered digital message signal; and comparing the computed second image digest with the reconstructed image digest to determine the authenticity of the received message analog signal.

2. The method of claim 1, wherein the step of validating the sender's public key is by receiving certified information transmitted by the sender.

3. The method of claim 1, wherein the step of validating the sender's public key is by accessing a reliable directory of public keys.

4. The method of claim 1, further comprising the step of prompting the sender to input the sender's private key prior to the step of computing the digest signature, the sender's private key being input by the steps of:

receiving a personal identification number manually input by the sender;

reading digital information on card provided by the sender; and computing the sender's private key from the personal identification number and the digital information read from the card.

5. The method of claim 1 further comprising the step of prompting the sender to input the sender's private key prior to the step of computing the digest signature, the sender's private key being input by the steps of:

receiving a personal identification number (PIN) manually input by the sender; and transmitting said PIN to a smart card provided by the sender, which card releases the sender's secret key only when enabled by the sender's correct PIN.

6. An apparatus using digital signatures to authenticate analog messages transmitted between a sender and a receiver comprising:

a signal generator generating an analog signal corresponding to an analog message to be authenticated;

a first analog-to-digital converter converting the analog signal to a digital message signal;

a first computer computing a first image digest from said digital message signal and, using a sender's private key and the computed first image digest, computing a digest signature, and combining at least the digital message signal, the computed digest signature and the sender's public key to form a composite digital message signal;

a digital-to-analog converter converting the composite digital message signal to a composite message analog signal;

a transmitter transmitting the composite message analog signal to a receiver;

a second analog-to-digital converter at the receiver converting a received composite message analog signal to recover said composite digital message signal;

a second computer recovering at least the digital message signal, the digest signature and the sender's public key from the received composite digital message signal and validating the recovered sender's public key; and a decoder decoding the recovered digest signature using a sender's public key to yield a reconstructed image digest;

said second computer computing a second image digest from the recovered digital message signal and comparing the computed second image digest with the reconstructed image digest to determine the authenticity of the received message analog signal.

7. The apparatus of claim 6, further comprising a keyboard and card reader providing respectively a personal identification number input by the sender and digital information from a card supplied by the sender to said first computer, said first computer computing the sender's private key from the personal identification number and digital information.

8. The apparatus of claim 6, further comprising a keyboard and card reader, said card reader accepting a smart card provided by the sender, the keyboard providing a personal identification number (PIN) input by the sender and transmitting said PIN to the smart card in the card reader, which card releases the sender's secret key only when enabled by the sender's correct PIN.

* * * * *